Nov. 3, 1953 W. A. WILLIAMS 2,657,584
PULLEY
Filed Feb. 14, 1950 3 Sheets-Sheet 1
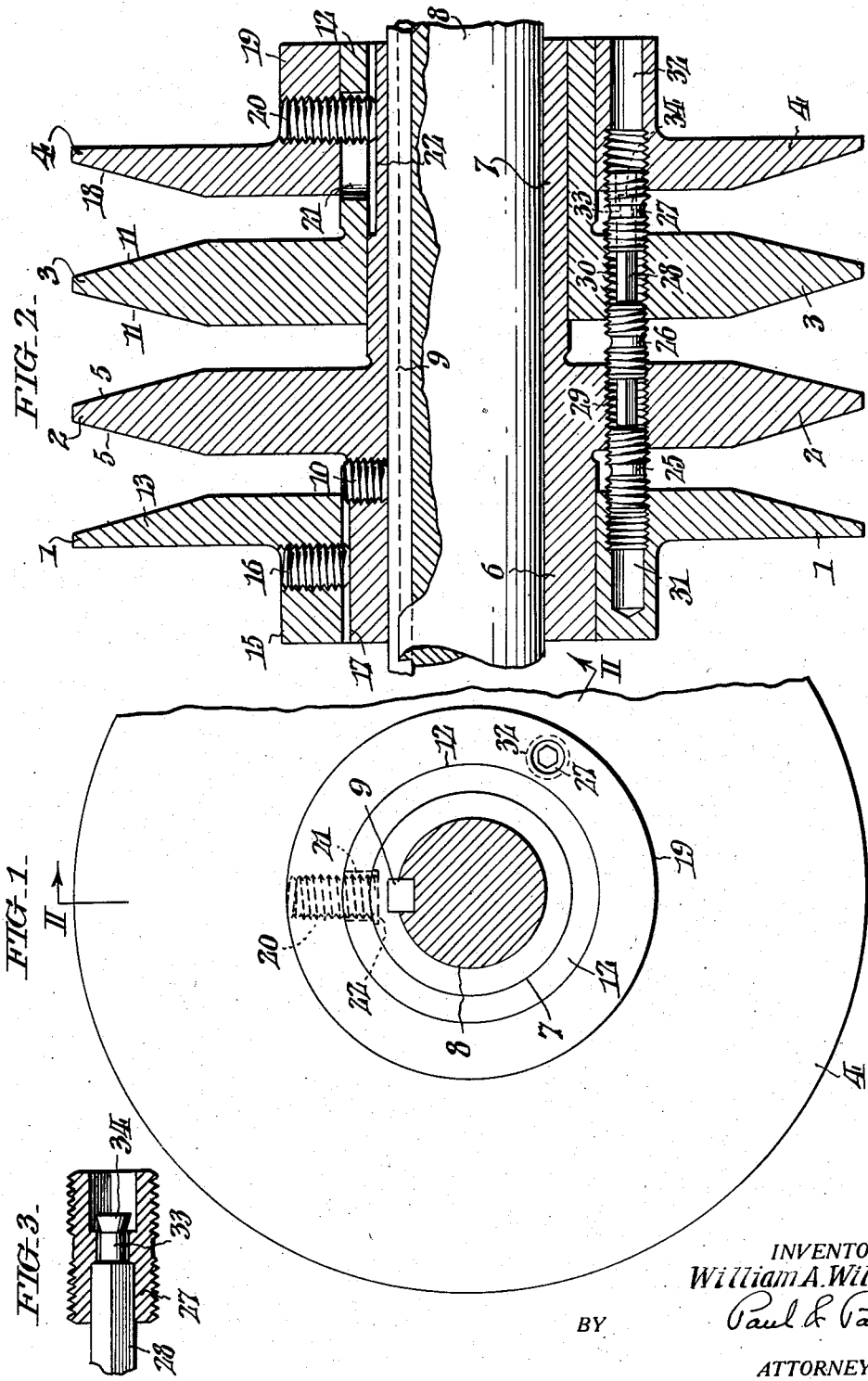
INVENTOR:
William A. Williams
BY Paul & Paul
ATTORNEYS.

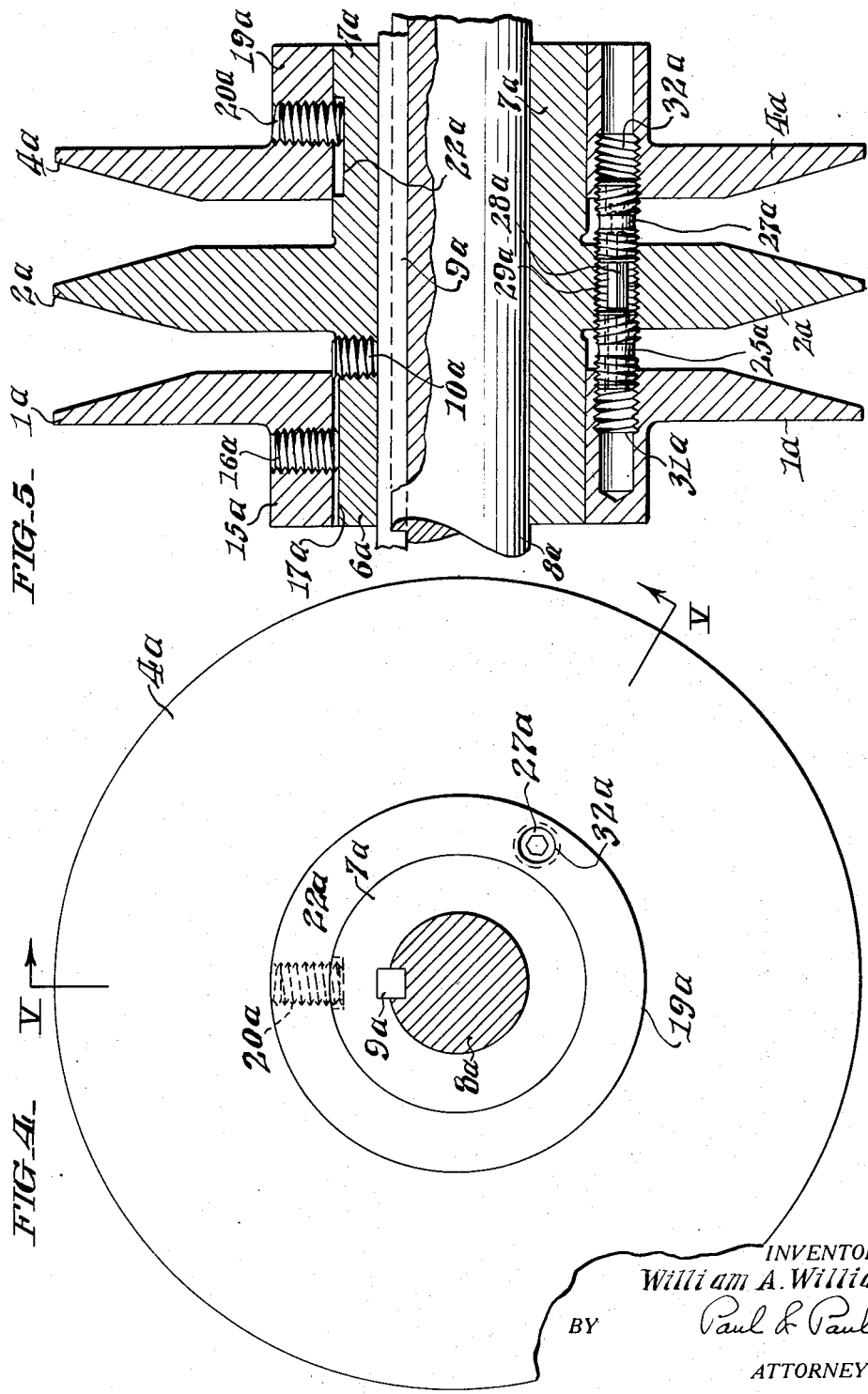

Nov. 3, 1953 — W. A. WILLIAMS — 2,657,584
PULLEY
Filed Feb. 14, 1950 — 3 Sheets-Sheet 3
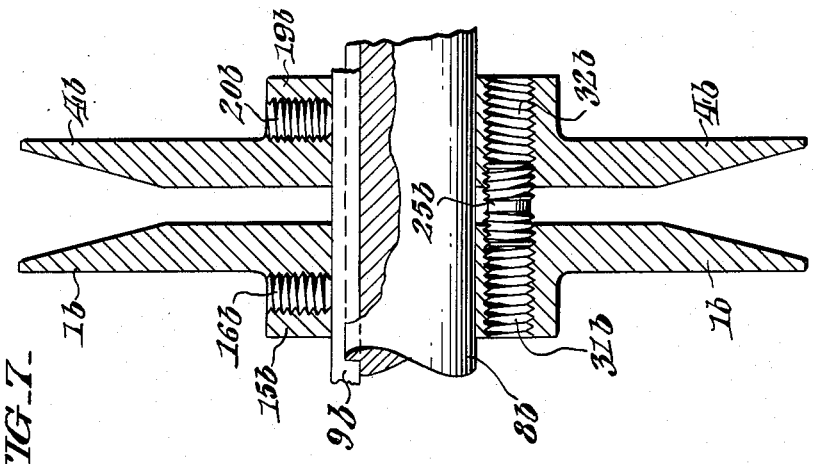
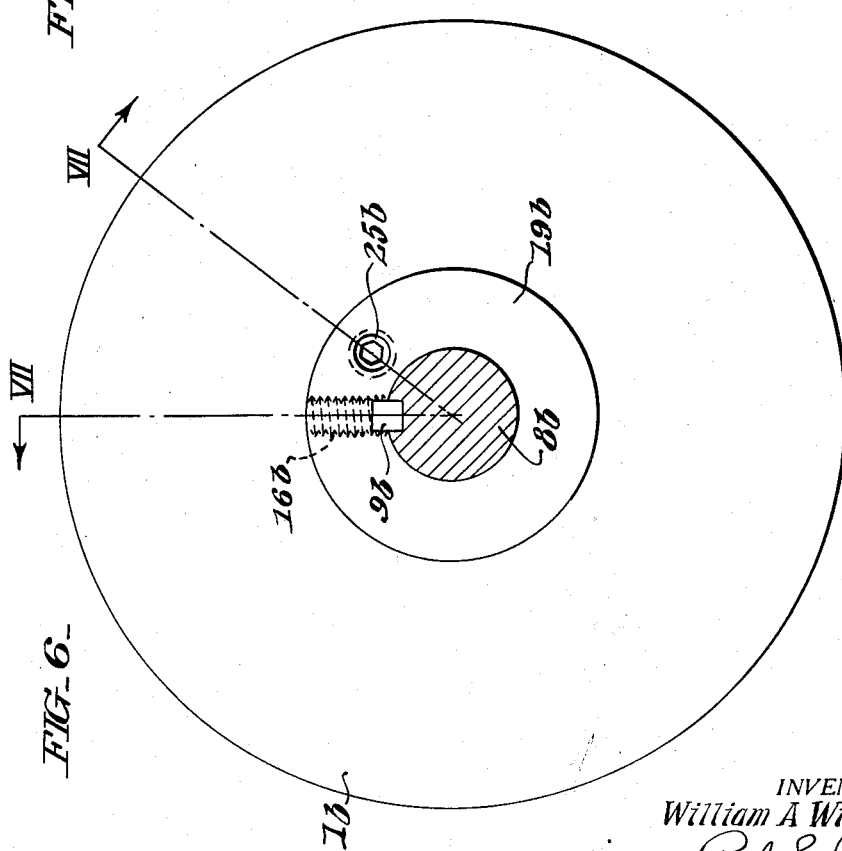
INVENTOR:
William A Williams
BY Paul & Paul
ATTORNEYS.

Patented Nov. 3, 1953

2,657,584

UNITED STATES PATENT OFFICE 2,657,584

PULLEY

William A. Williams, Philadelphia, Pa., assignor to The American Pulley Company, Philadelphia, Pa., a corporation of Pennsylvania Application February 14, 1950, Serial No. 144,047

9 Claims. (Cl. 74—230.17)

1

This invention relates to pulleys. More particularly, it is concerned with pulleys of the grooved variable diametral pitch type for use with what are ordinarily known as "V" belts.

The chief aim of my invention is to provide pulleys of the kind referred to which are simple in construction; which lend themselves to expeditious production in quantity at small cost; which are easily adjusted for speed variation; and which are immune against accidental displacement, after adjustment, under operating conditions.

How the foregoing and other important objects and advantages are realized in practice, will appear from the following detailed description of the attached drawings, wherein Fig. 1 shows the elevation of one end of a triple groove adjustable pulley conveniently embodying my invention.

Fig. 2 is a staggered longitudinal sectional view taken as indicated by the angled arrows II—II in Fig. 1.

Fig. 3 is a fragmentary view in section showing part of the means by which adjustment of the pulley is effected.

Figs. 4, 5 and 6, 7 are views, respectively corresponding to Figs. 1 and 2, showing double and single groove adjustable pulleys likewise conveniently embodying my invention.

In the triple groove form illustrated in Figs. 1 and 2, my improved adjustable pulley comprises four flange components which are respectively designated by the numerals 1, 2, 3 and 4. The flange of inner component 2 is circumferentially beveled on both sides as at 5 and has oppositely extending hub portions 6 and 7 with an axial bore extending continuously through them to fit over a shaft 8. By means of the key indicated at 9, the component 2 is held against rotation relative to the shaft 8, while a set screw 10 threadedly engaged in the hub portion 6 and binding upon the key, serves to fix said component against displacement longitudinally of said shaft. The other inner flange component 3 is likewise circumferentially beveled as at 11, and has but a single outwardly-extending hub portion 12 to fit over the hub portion 7 of component 2. The outer flange component 1 is circumferentially beveled at its inner side only as at 13, and has a short outward hub portion 15. A set screw 16 threadedly engaged in the hub portion 15 of component 1 projects into a longitudinal groove 17 in the hub portion 6 of component 2. The other outer flange component 4 is identical to component 1 in that the inner face of its flange only is circumferentially beveled as at 18, and in that

2 it has an outwardly extending hub portion 19. A set screw 20 threadedly engaged in the hub portion 19 of component 4 passes through an elongate slot 21 in the hub portion of component 3 and projects into a longitudinal groove 22 in the hub portion 7 of component 1. By virtue of the construction just described, the components 3 and 4 are both held against rotation relative to component 2, with capacity to be shifted back and forth longitudinally of shaft 8 in respect to each other and to said component 2 for adjustment purposes.

The means provided for adjusting the pulley in accordance with my invention, includes three screw elements 25, 26 and 27 having polygonal axial apertures through which a slide key 28 of corresponding cross sectional configuration extends loosely to hold said elements in alignment for rotation together in assembly. As shown in Fig. 2, the two inner components 2 and 3 have eccentrically disposed transverse holes 29 and 30 through their flanges, whereof the ends are oppositely threaded for engagement by the corresponding ends of the screw elements 25, 26 and 27; and two outer components 1 and 4 have similarly located transverse holes 31 and 32 in their flanges which are threaded to cooperate with the distal ends respectively of the screw elements 25 and 27. From Fig. 2, it will be further noted that the mid portion of the aperture in the screw element 27 is reduced in diameter to receive the similarly reduced shouldered end 33 of the key 28 which is peened over as at 34 so as to be held in place in the assembly. Adjustment of the pulley may be effected with the aid of a suitable wrench (not illustrated) having a shank of polygonal cross section to fit into the unoccupied outer end portion of the axial aperture in the screw element 27, turning movement in one direction or the other being communicated to the other screw elements 25 and 27 through the slide key connection 28.

By reason of the opposite end threading of the screw elements 25—27, it will be evident that upon turning them in one direction, the flange components will be concurrently shifted toward each other, and upon turning of said elements in the other direction said components will be shifted away from each other. In this connection, it is to be noted that the length of the slot 21 in the hub portion 12 of flange component 3 is such as to limit, by cooperation with the set screw 20, the extent to which the several components may separate, and thus prevent the screw elements 25—27 from running out of the tapped holes in the flanges of said components.

After the desired adjustment is made, the set screws 16 and 20 are tightened to insure against relative accidental displacement of the flange components 1–4.

In the double groove adjustable pulley of my invention illustrated in Figs. 4 and 5, there are three flange components 1a, 2a and 4a which respectively correspond to the components 1, 2 and 4 of the first described embodiment. As before, the component 1a is axially slidable on one hub portion 6a of component 2a. Here however, the component 4a is axially shiftable directly on the hub portion 7a of the component 2a. A further modification to be observed is that the set screw 20a in hub 19a of component 4a extends into the longitudinal groove 22a in the hub portion 7a of component 2a, and that the length of said groove is such as to limit the extent to which the component 7a may be shifted. In this instance but two screw elements 25a and 27a are required in the adjusting means, these being identical with the elements 25 and 27 of the first embodiment, and connected for concurrent rotation similarly by a slide key 28a of polygonal cross section. All other parts not specifically referred to in connection with Figs. 4 and 5 but having their counterparts in the first described embodiment, are identified by the same reference numerals previously used with addition, in each instance, of the exponent a for convenience of more ready distinction.

The single groove adjustable pulley of my invention illustrated in Figs. 6 and 7 has but two flange components 1b and 4b corresponding respectively to the components 1 and 4 of Figs. 1 and 2. As shown, the components 1b and 4b are mounted in opposed relation directly on the shaft 8b and constrained to longitudinal shifting thereon, for adjustment purposes, by the key 9b. In this case, the adjustment means consists of a single screw element 25b which is identical with the element 25 of the first described embodiment and which has its oppositely threaded ends threadedly engaged in the correspondingly tapped holes 31b and 32b in the hubs 15b and 19b of the two flange components. After the desired adjustment is made, the set screws 16b and 20b are tightened to secure the flange components 1b, 4b against relative axial displacement on the shaft 8b.

Having thus described my invention, I claim:

1. In a variable pitch triple groove pulley, an intermediate pair of juxtaposed opposing components with flanges circumferentially beveled on opposite sides, one of said components adapted to be fixedly secured to a shaft, and the other held against rotation relative to the first mentioned component but axially shiftable toward and away from it; a second pair of components with flanges circumferentially beveled at their inner sides to respectively oppose the components of the first pair and held against rotation relative to the latter components but shiftable toward and away from them respectively; a plurality of axially-aligned adjusting screw elements respectively with oppositely threaded ends, one element with its opposite ends engaged in correspondingly threaded ends of transverse holes in the first mentioned pair of components, and the other elements each with one of its ends engaging a corresponding internal thread in the opposite end of the hole in one of the components of the first mentioned pair, and its other end in a corresponding internally threaded hole in the mating component of the second pair; and means connecting the several screw elements for rotation together with capacity to shift axially relative to each other in adjusting the pulley.

2. A variable pitch pulley according to claim 1, further including stop means to limit the extent of separation of the flange components incident to adjusting the pulley.

3. In a multiple groove variable pitch pulley, a plurality of flange components all mounted against relative rotation upon a shaft with capacity to be shifted therealong, axially-aligned one piece screw elements with oppositely threaded ends engaged in aligned holes correspondingly tapped from opposite ends in respectively-adjacent flanges; and means connecting the screw elements for rotation together, with capacity to shift axially relative to each other incident to adjustment of the pulley.

4. A multiple groove variable pitch pulley according to claim 3, wherein the several adjusting screw elements have polygonal axial apertures; wherein the connecting means is in the form of a key of corresponding cross section engaging through apertures in the several screw elements with a slide fit; and wherein said key is fixed in one of said screw elements.

5. A multiple groove variable pitch pulley according to claim 3, wherein the several adjusting screw elements have polygonal axial apertures; wherein the connecting means is in the form of a key of corresponding cross section engaging through the apertures in the several screw elements with a slide fit; and wherein said key extends part way into and is fixed in one of the endmost screw elements, whereby part of the aperture in such element is left unoccupied to enable use of a shank wrench in adjusting the pulley.

6. In a double groove variable pitch pulley comprising a center flange component adapted to be fixedly secured to a shaft; opposing outer flange components held against rotation relative to the first component but axially movable toward and away from it; a pair of axially aligned adjusting screw elements respectively having oppositely threaded ends, the confronting ends of said elements being engaged respectively in corresponding internal threads at opposite ends of a transverse hole through the flange of the center component, and the remote ends of said elements being engaged respectively in corresponding internal threads of transverse holes through the flanges of the two outer components; and means connecting the two screw elements for rotation together with capacity to shift axially relative to each other incident to adjustment of the pulley.

7. A double groove variable pitch pulley according to claim 5, wherein the center component has oppositely extending hub portions; wherein the outer components are mounted respectively on the oppositely extending hub portions of the center component; and wherein set screws engaged in the outer components extend into longitudinal guide grooves in the respective opposite hub portions of said center component.

8. In a variable pitch triple groove pulley, an intermediate pair of juxtaposed opposing components with flanges circumferentially beveled on opposite sides, one of said components adapted to be fixedly secured to a shaft, and the other held against rotation relative to the first mentioned component but axially shiftable toward and away from it; a second pair of components with flanges circumferentially beveled at their inner sides to respectively oppose the components of the first pair and held against rotation relative to the latter components but shiftable toward and away from them respectively; a plurality of axially-aligned adjusting screw elements respectively with oppositely threaded ends, one element with its opposite ends engaged in correspondingly threaded ends of transverse holes in the first mentioned pair of components, and the other elements each with one of its ends engaging a corresponding internal thread in the opposite end of the hole in one of the components of the first mentioned pair, and its other end in a corresponding internally threaded hole in the mating component of the second pair; and means whereby the several screw elements may be rotated together with capacity to shift axially relative to each other in adjusting the pulley.

9. In a double groove variable pitch pulley comprising a center flange component adapted to be fixedly secured to a shaft; opposing outer flange components held against rotation relative to the first component but axially movable toward and away from it; a pair of axially aligned adjusting screw elements respectively having oppositely threaded ends, the confronting ends of said elements being engaged respectively in corresponding internal threads at opposite ends of a transverse hole through the flange of the center component, and the remote ends of said elements being engaged respectively in corresponding internal threads of transverse holes through the flanges of the two outer components; and means whereby the two screw elements may be rotated together with capacity to shift axially relative to each other incident to adjustment of the pulley.

WILLIAM A. WILLIAMS.

References Cited in the file of this patent

UNITED STATES PATENTS

| Number | Name | Date |
|---|---|---|
| 516,197 | Given | Mar. 13, 1894 |
| 1,881,028 | Meyer | Oct. 4, 1932 |
| 2,158,047 | Weston | May 9, 1939 |
| 2,234,917 | Koch | Mar. 11, 1941 |